United States Patent
Bassett

(10) Patent No.: US 8,940,163 B2
(45) Date of Patent: Jan. 27, 2015

(54) APPARATUS FOR DISPERSING ADDITIVE INTO A FLUID STREAM

(75) Inventor: Laurence W. Bassett, Killingworth, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1010 days.

(21) Appl. No.: 13/054,955

(22) PCT Filed: Jul. 2, 2009

(86) PCT No.: PCT/US2009/049473
§ 371 (c)(1),
(2), (4) Date: Jan. 20, 2011

(87) PCT Pub. No.: WO2010/011483
PCT Pub. Date: Jan. 28, 2010

(65) Prior Publication Data
US 2011/0121036 A1     May 26, 2011

Related U.S. Application Data

(60) Provisional application No. 61/082,334, filed on Jul. 21, 2008.

(51) Int. Cl.
*C02F 1/68* (2006.01)
*C02F 1/76* (2006.01)
(Continued)

(52) U.S. Cl.
CPC .............. *B01D 37/025* (2013.01); *C02F 1/688* (2013.01); *B01F 1/0027* (2013.01); *C02F 1/68* (2013.01); *C02F 1/76* (2013.01); *C02F 2201/006* (2013.01)
USPC ......... 210/206; 210/232; 210/416.3; 222/173

(58) Field of Classification Search
CPC .............. C02F 1/50; C02F 1/68; C02F 1/687; C02F 1/688; C02F 2201/002; C02F 2201/003; C02F 2201/006; B01D 35/00; B01F 1/0027; B01F 3/12; B01F 2001/0055; B01F 2001/0061; B01F 2001/0072; B01F 2001/0077; B01F 2215/0009; B01F 2215/0052
USPC ......................... 210/206, 232, 416.3; 222/173
See application file for complete search history.

(56) References Cited

U.S. PATENT DOCUMENTS

| | | |
|---|---|---|
| 2,546,568 A | 3/1951 | Taylor |
| 2,631,521 A | 3/1953 | Atkins, Jr. |

(Continued)

FOREIGN PATENT DOCUMENTS

| | | |
|---|---|---|
| CN | 1246806 | 3/2000 |
| EP | 0421737 | 4/1991 |

(Continued)

OTHER PUBLICATIONS

International Search Report for PCT/US2009/049473, 5 pgs., mailed Feb. 18, 2010.

(Continued)

*Primary Examiner* — Lucas Stelling
(74) *Attorney, Agent, or Firm* — Scott A. Baum

(57) ABSTRACT

An apparatus for dispersing additive into a fluid stream is disclosed. Also disclosed are systems comprising a fluid handling apparatus and an additive pod configured to disperse additive into a fluid stream. In some embodiments, the additive pods are easy to install into an outlet portion of a fluid handling apparatus, and do not require special training or the use of tools.

17 Claims, 6 Drawing Sheets

(51) Int. Cl.
*B01D 35/00* (2006.01)
*B01F 1/00* (2006.01)
*B01D 37/02* (2006.01)

(56) References Cited

U.S. PATENT DOCUMENTS

| | | |
|---|---|---|
| 2,705,091 A | 3/1955 | Marchand |
| 3,183,057 A | 5/1965 | Marks |
| 3,255,691 A | 6/1966 | Schwartz |
| 3,519,134 A | 7/1970 | Hassinger |
| 3,568,887 A | 3/1971 | Jacobs |
| 3,627,133 A | 12/1971 | Rak |
| 3,754,079 A | 8/1973 | Callerame |
| 3,883,429 A | 5/1975 | Hanford |
| 4,228,000 A | 10/1980 | Hoeschler |
| 4,324,494 A | 4/1982 | Pryor |
| 4,370,305 A | 1/1983 | Affonso |
| 4,414,996 A | 11/1983 | Klepa |
| 4,465,488 A | 8/1984 | Richmond |
| 4,513,713 A | 4/1985 | Koumura |
| 4,547,381 A | 10/1985 | Mason |
| 4,565,302 A | 1/1986 | Pfeiffer |
| 4,571,327 A * | 2/1986 | Larson et al. ............ 422/263 |
| 4,582,223 A | 4/1986 | Kobe |
| 4,660,645 A * | 4/1987 | Newlove et al. .......... 166/304 |
| 4,674,657 A | 6/1987 | Daniels |
| 4,689,169 A | 8/1987 | Mason |
| 4,786,500 A | 11/1988 | Wong |
| 4,817,822 A | 4/1989 | Rand |
| 5,019,346 A | 5/1991 | Richter |
| 5,036,462 A | 7/1991 | Kaufman |
| 5,045,195 A | 9/1991 | Spangrud |
| 5,076,425 A | 12/1991 | Plone |
| 5,096,721 A | 3/1992 | Levy |
| 5,106,500 A | 4/1992 | Hembree |
| 5,114,045 A | 5/1992 | Herpe |
| 5,114,048 A | 5/1992 | Minke |
| 5,211,973 A | 5/1993 | Nohren, Jr. |
| 5,215,659 A | 6/1993 | Ando |
| 5,268,093 A | 12/1993 | Hembree |
| 5,342,518 A | 8/1994 | Posner |
| 5,370,041 A | 12/1994 | Lowe |
| 5,427,682 A | 6/1995 | Vogel |
| 5,433,343 A | 7/1995 | Meshberg |
| 5,443,739 A | 8/1995 | Vogel |
| 5,476,579 A | 12/1995 | Choi |
| 5,518,743 A | 5/1996 | Pergola |
| 5,525,214 A | 6/1996 | Hembree |
| 5,527,451 A | 6/1996 | Hembree |
| 5,536,394 A | 7/1996 | Lund |
| 5,587,089 A | 12/1996 | Vogel |
| 5,597,487 A | 1/1997 | Vogel |
| 5,709,694 A | 1/1998 | Greenberg |
| 5,772,003 A | 6/1998 | Hunt |
| 5,882,588 A | 3/1999 | Laberge |
| 5,897,770 A | 4/1999 | Hatch |
| 5,918,768 A | 7/1999 | Ford |
| 5,922,378 A | 7/1999 | Kagan |
| 5,928,504 A | 7/1999 | Hembre |
| 5,931,343 A | 8/1999 | Topar |
| 5,941,380 A | 8/1999 | Rothman |
| 5,974,810 A | 11/1999 | Speronello |
| 5,980,959 A | 11/1999 | Frutin |
| 5,992,378 A | 11/1999 | Parkinson |
| 5,997,734 A | 12/1999 | Koski |
| 6,004,458 A | 12/1999 | Davidson |
| 6,024,012 A | 2/2000 | Luzenberg, Jr. |
| 6,027,572 A | 2/2000 | Labib |
| 6,053,485 A | 4/2000 | Pan et al. |
| 6,097,685 A | 8/2000 | Yamaguchi |
| 6,098,735 A | 8/2000 | Sadarangani |
| 6,098,795 A | 8/2000 | Mollstam |
| 6,099,735 A | 8/2000 | Kelada |
| 6,103,114 A | 8/2000 | Tanner |
| 6,105,638 A | 8/2000 | Edwards |
| 6,202,541 B1 | 3/2001 | Cai |
| 6,221,416 B1 | 4/2001 | Nohren, Jr. |
| 6,244,474 B1 | 6/2001 | Loeffler |
| 6,280,617 B1 | 8/2001 | Brandreth, III |
| 6,290,848 B1 | 9/2001 | Tanner |
| 6,372,270 B1 | 4/2002 | Denny |
| 6,405,900 B1 | 6/2002 | Kown |
| 6,409,099 B1 | 6/2002 | Goodwin |
| 6,419,118 B1 | 7/2002 | Rees |
| 6,423,224 B1 | 7/2002 | Tanner |
| 6,478,192 B2 | 11/2002 | Heyes |
| 6,482,451 B1 | 11/2002 | Baron |
| 6,527,109 B2 | 3/2003 | Schoo |
| 6,540,070 B1 | 4/2003 | Conwell |
| 6,565,749 B1 | 5/2003 | Hou |
| 6,602,410 B1 | 8/2003 | Tanner |
| 6,602,541 B1 | 8/2003 | McCurdy |
| 6,651,824 B2 | 11/2003 | Miller |
| 6,652,893 B2 | 11/2003 | Berson |
| 6,672,817 B2 | 1/2004 | Denny |
| 6,759,072 B1 | 7/2004 | Gutwein |
| 6,770,323 B2 | 8/2004 | Genzer |
| 6,845,788 B2 | 1/2005 | Extrand |
| 6,852,390 B2 | 2/2005 | Extrand |
| 6,872,303 B2 | 3/2005 | Knapp |
| 6,913,691 B2 | 7/2005 | Holler |
| 7,112,276 B2 | 9/2006 | Holler |
| 7,763,170 B2 | 7/2010 | Bassett |
| 2001/0036421 A1 | 11/2001 | Speronello |
| 2002/0005377 A1 | 1/2002 | Tanner |
| 2002/0125182 A1 | 9/2002 | Kijima |
| 2002/0125187 A1 | 9/2002 | Tanner |
| 2003/0012849 A1 | 1/2003 | Berson |
| 2003/0049352 A1 | 3/2003 | Mehansho |
| 2003/0111398 A1 | 6/2003 | Eilers |
| 2003/0203075 A1 | 10/2003 | Taylor |
| 2004/0055948 A1 | 3/2004 | Blum |
| 2004/0055984 A1 | 3/2004 | Gundlach |
| 2004/0065002 A1 * | 4/2004 | Hu ........................... 44/363 |
| 2004/0084096 A1 | 5/2004 | Whaley |
| 2004/0129627 A1 | 7/2004 | McGibbon |
| 2004/0175250 A1 | 9/2004 | Yoneoka |
| 2005/0040092 A1 | 2/2005 | Eilers |
| 2005/0133420 A1 | 6/2005 | Rinker |
| 2005/0133427 A1 | 6/2005 | Rinker |
| 2005/0258082 A1 | 11/2005 | Lund |
| 2006/0006107 A1 | 1/2006 | Olson |
| 2006/0191824 A1 | 8/2006 | Arett |
| 2006/0261000 A1 | 11/2006 | Bassett |
| 2007/0084772 A1 | 4/2007 | Holler |
| 2007/0108115 A1 * | 5/2007 | Cline et al. .............. 210/206 |
| 2008/0237924 A1 | 10/2008 | Bassett |

FOREIGN PATENT DOCUMENTS

| | | |
|---|---|---|
| EP | 0919269 | 6/1999 |
| GB | 2329589 | 3/1999 |
| JP | 59154116 | 9/1984 |
| JP | 2006-187720 | 7/2006 |
| JP | 2006-348966 | 12/2006 |
| JP | 2007-528235 | 10/2007 |
| KR | 10-2008-0006591 | 1/2008 |
| WO | WO 01/60750 | 8/2001 |
| WO | WO 02/00332 | 1/2002 |
| WO | WO 2005/007206 | 1/2005 |
| WO | WO 2007/148047 | 12/2007 |

OTHER PUBLICATIONS

Written Opinion of the ISA for International Application No. PCT/US2009/049473, 7 pgs., mailed Feb. 18, 2010.

* cited by examiner

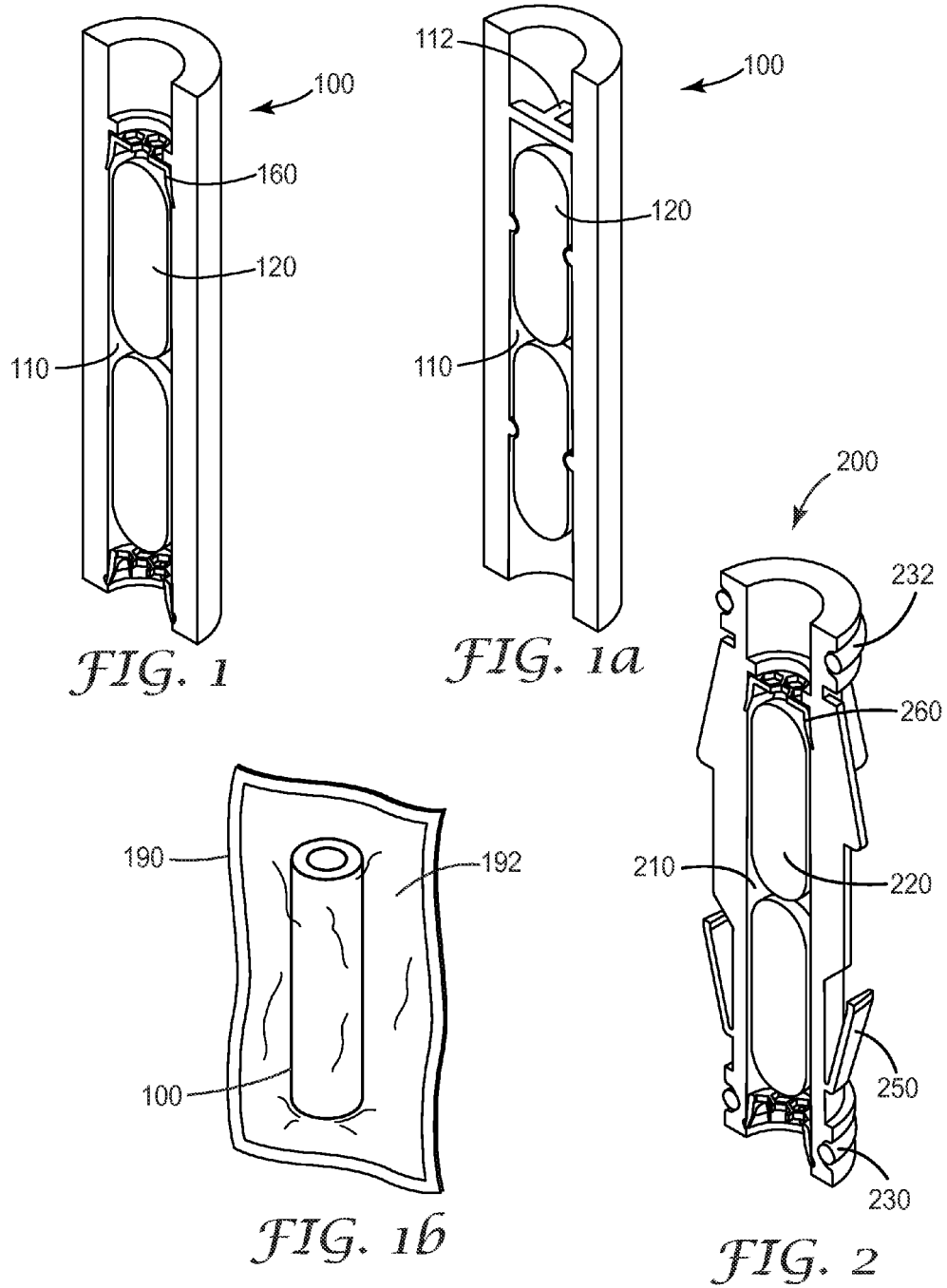

APPARATUS FOR DISPERSING ADDITIVE INTO A FLUID STREAM

CROSS REFERENCE TO RELATED APPLICATIONS

This application is a national stage filing under 35 U.S.C. 371 of PCT/US2009/049473, filed Jul. 2, 2009, which claims priority to U.S. Provisional Application No. 61/082,334, filed Jul. 21, 2008, the disclosure of which is incorporated by reference in its/their entirety herein.

FIELD OF THE INVENTION

The present disclosure relates to fluid handling systems. More particularly, the present disclosure relates to methods and apparatuses for dispersing additives into a fluid stream of a fluid handling system.

BACKGROUND

It has been known to disperse various additives into fluid streams in both industrial and residential applications. One example of such an application is in the maintenance of drinking water dispensing systems. In such systems, there is a potential for undesirable substances to form within the plumbing, especially in plumbing that is downstream of any conditioning device, such as a water filter. While a water filter, for example, may remove most or all undesirable substances originating from upstream plumbing, plumbing downstream of such a filter may remain relatively unprotected. Such undesirable substances may impart a noticeable odor or taste to the water that flows through the downstream plumbing on its way to consumption.

In an effort to reduce or eliminate such undesirable substances, a maintenance worker may be required to periodically, often at the time of filter change, disconnect such downstream plumbing to flush fluid containing an additive, such as a sanitizer, into the affected fluid passageways. This work can be time consuming and require a maintenance worker to carry and use a number of tools. For example, the worker may require a bucket of fluid and a pump, which must be plugged into a local power source, to pump sanitizing fluid from the bucket into and through the downstream plumbing.

Other systems, including industrial fluid handling systems, may benefit from the continuous introduction of additives beyond sanitizing agents, including, for example, flavoring or other enhancements for water, and processing chemicals for industrial applications.

There is a continuing need to provide efficient ways to introduce additives into such industrial and residential fluid handling systems.

BRIEF SUMMARY

The present disclosure relates generally to an apparatus for introducing an additive into a fluid stream, systems comprising the apparatus, and methods of using the same. More particularly, the present disclosure relates to an additive pod configured to be disposed in an outlet portion of a fluid handling apparatus and further configured to disperse at least one additive into a fluid stream. The apparatus of the present disclosure can reduce the time and amount of equipment necessary to, for example, introduce a sanitizing agent into a fluid stream and associated downstream plumbing.

The present application discloses an apparatus for introducing an additive into a fluid stream comprising an additive pod having at least one sidewall defining an additive holding chamber, wherein at least one additive is disposed. The additive holding chamber is configured to disperse the additive into the fluid stream and is configured to be disposed in an outlet portion of a fluid handling apparatus. In some embodiments, at least a portion of the at least one sidewall is porous. In some embodiments, the at least one sidewall comprises a substantially cylindrical tube having a closed cylinder wall and first and second at least partially open axial ends. In at least one embodiment, additive pod further comprises at least one engagement tab configured to cooperatively engage with at least one receiving member on the outlet portion of the fluid handling apparatus. In some embodiments, the fluid handling apparatus may comprise a filter cartridge.

The at least one additive may be provided in various forms, for example, in pill, tablet, or capsule form. In some embodiments, the at least one additive may be configured to retain itself within the additive holding chamber prior to dispersion of the additive into the fluid stream. The at least one additive may comprise a sanitizer or other substances, for example, flavoring agents. Where a sanitizer is employed, such sanitizer may be selected, for example, from the group consisting of chlorine, chlorine dioxide, iodine, hypoiodous acid, bromine, hypobromous acid, hypochlorous acid, fluorine, alcohol, hydrogen peroxide, ozone, and combinations thereof. Additional lists of possible sanitizing agents, and further details thereof, may be found, for example, in WO 01/60750 A2 (publication of PCT/US01/05002), the disclosure of which is hereby incorporated by reference to the extent not inconsistent with the present disclosure. In some embodiments, the sanitizer is relatively volatile and has a short shelf life when exposed to ambient conditions. Where non-sanitizing substances are employed, such substances may be selected, for example, from the group consisting of flavoring agents, vitamins, dyes, scale inhibitors, process chemicals, and combinations thereof.

In some embodiments, the apparatus further comprises at least one additive retaining member configured to retain the additive within the additive holding chamber prior to dispersion of the additive into the fluid stream. Where employed, the at least one additive retaining member may be configured to allow the fluid stream to pass therethrough.

In one embodiment, the apparatus further comprises a downstream trap member configured to prevent portions of non-dispersed additive from escaping the additive holding chamber.

Where appropriate, the apparatus may further comprise a storage container comprising at least one sidewall defining an enclosed volume, wherein the additive pod may be disposed within the enclosed volume. In some embodiments, the additive pod is hermetically sealed within the enclosed volume.

In some embodiments, the additive pod further comprises at least one upstream sealing member configured to form a seal with the outlet portion of the fluid handling apparatus and at least one downstream sealing member configured to form a seal with a downstream article. One or both sealing members may be omitted as required by a given application. Additional sealing members may further be provided as appropriate for a given application.

The present application further discloses systems for introducing an additive into a fluid stream. Such systems may comprise a fluid handling apparatus and an additive pod. In some embodiments, the additive pod is disposed in an enclosed volume of a storage container. In other embodiments, both an additive pod and a fluid handling apparatus are disposed in an enclosed volume of a storage device. Where appropriate, the enclosed volume may be hermetically sealed.

The present application further discloses methods for using an apparatus to introduce an additive into a fluid stream. In some embodiments, the methods comprise installing an additive pod into an outlet portion of a fluid handling apparatus without the use of tools. Methods of sanitizing a fluid stream and associated downstream plumbing are further disclosed. These and other aspects of the disclosure will be apparent from the detailed description below. In no event, however, should the above summaries be construed as limitations to the claimed subject matter, which subject matter is defined solely by the attached claims, as may be amended during prosecution.

In the context of the present disclosure:

"Pill form" refers to any form typically employed, for example, to carry a dosage of a solid or liquid substance in a compact and substantially solid package. For example, tablets, pellets, or capsules, as may be employed in the pharmaceutical field.

"Downstream article" refers to any suitable article or machine that is functionally situated in a downstream direction. Examples of downstream articles may include, but are not limited to, pipes or other fluid conduits, pumps, valves, manifolds, reservoirs, spigots, nozzles, and the like.

"Outlet portion" refers to an opening (or a plurality of openings) that permits escape or release; typically functionally situated in a downstream direction of an inlet portion and an inner volume of, for example, a filter cartridge.

BRIEF DESCRIPTION OF THE DRAWINGS

Throughout the specification, reference is made to the appended drawings, where like reference numerals designate like elements, and wherein:

FIGS. 1 and 1a show exemplary embodiments of an apparatus for introducing an additive into a fluid stream;

FIG. 1b shows one embodiment of an apparatus for introducing an additive into a fluid stream, wherein the apparatus is disposed within an enclosed volume of a storage container;

FIG. 2 shows show one embodiment of an apparatus for introducing an additive into a fluid stream;

DETAILED DESCRIPTION OF THE ILLUSTRATIVE EMBODIMENTS

Figure 3:
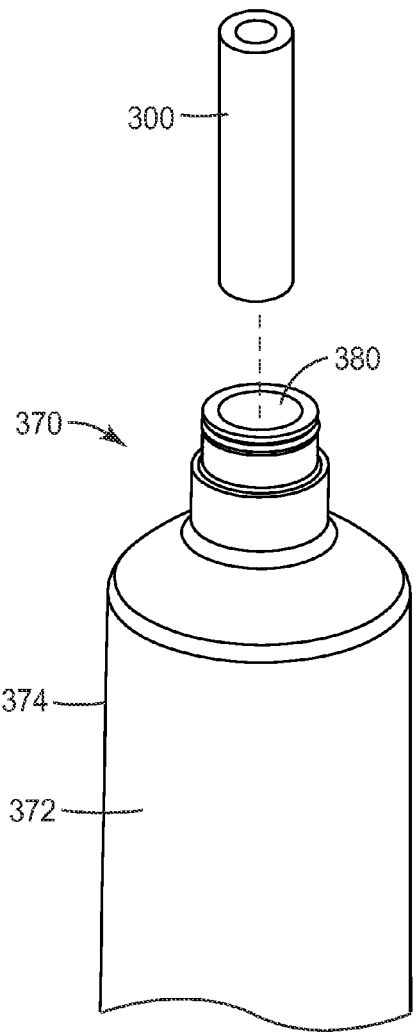
FIGS. 3 and 4 are respective exploded views of an apparatus for introducing an additive into a fluid stream as they may be disposed in an outlet portion of a fluid handling apparatus.

FIGS. 1 and 1a show cross-sections of exemplary embodiments of an apparatus for introducing an additive 120 into a fluid stream. In one embodiment, an additive pod 100 comprises at least one sidewall defining an additive holding chamber 110 and at least one additive 120 disposed in the additive holding chamber 110.

The at least one additive may be provided in various forms, for example, in pill or tablet form. In such forms, the additive may be provided in a solid or fluid state, for example, as a fluid encapsulated within a soluble casing. Solid suspensions within a fluid are also envisioned.

In one embodiment, the additive comprises a sanitizer. In some embodiments, the additive comprises, for example, a flavoring agent. The additive may also comprise a dye. When provided as a sanitizer, the additive may comprise, for example, any sanitizing agent suitable for substantially reducing microorganisms in a fluid stream and associated downstream plumbing.

In some embodiments, the additive pod comprises a downstream trap member 112 configured to prevent portions of non-dispersed additive from escaping the additive holding chamber. It is envisioned that, in some embodiments, wherein the additive 120 dissolves and disperses into a fluid stream, the additive may break down into relatively large pieces that could dislodge and cause undesirable conditions if allowed to travel to downstream plumbing. Where employed, a downstream trap member 112 may prevent such dislodged pieces from escaping the additive holding chamber 110, thereby allowing for adequate additive break down to take place within the additive pod. As shown in the embodiment in FIG. 1a, the downstream trap member may comprise at least one cross member traversing an opening on the downstream end of the additive holding chamber, leaving the opening at least partially open to allow fluid to pass.

In some embodiments, as shown in FIG. 1, the additive pod 100 comprises at least one additive retaining member 160 configured to retain the additive 120 within the additive holding chamber prior to dispersion of the additive into the fluid stream. Where employed, additive retaining members 160 comprise a surface that may be at least partially porous, allowing for fluid to flow therethrough. In some embodiments, the additive retaining member comprises retention structure, such as a flange, to allow it to be captured within corresponding structure in the additive holding chamber. As shown in FIG. 1, each additive retaining member may comprise a relatively flexible circumferentially disposed flange configured to snap into a corresponding groove in the at least one sidewall of the additive holding chamber. Additive retaining members, where employed, may be used in tandem, in respective upstream and downstream positions to hold the at least one additive in place from two ends of the additive holding chamber.

In one embodiment, as shown in FIG. 1a, the additive 120 is configured to retain itself within the additive holding chamber. An exemplary self-retaining feature may comprise a combination of depressions about a perimeter of the additive with cooperating raised protrusions about the sidewall of the additive holding chamber. Alternatively, the additive 120 may comprise protrusions and the additive holding chamber may comprise cooperating depressions. Self-retention may alternatively be attained, for example, by way of a friction fit wherein the additive is configured to fit in close contacting relation with the at least one sidewall of the additive holding chamber.

FIG. 1b shows one embodiment of an apparatus for introducing an additive into a fluid stream, wherein the apparatus is disposed within an enclosed volume of a storage container. A storage container may be employed whether the additive comprises a sanitizer or other substance. Often, sanitizing agents are highly volatile, having an extremely short shelf when exposed to ambient air. In embodiments where a volatile sanitizer is employed, the additive pod 100 may be shipped and stored in a storage container 190 having an enclosed volume 192 that may be hermetically sealed, as shown in FIG. 1*b*. Accordingly, a maintenance worker may remove the additive pod 100 from the storage container 190 just before use, thereby minimizing the exposure of the sanitizer to ambient conditions. It is envisioned that, in some embodiments, an additive pod comprising a volatile sanitizer may be manufactured under environmentally controlled conditions and promptly sealed within a storage container prior to leaving such controlled conditions. Such controlled conditions may include, for example, low humidity or vacuum. Examples of storage containers include sealed plastic bags, re-sealable plastic bags, metal-foil bags, plastic canisters (e.g., film canisters and the like), and similar containers made of any material suitable for a selected application. In applications where such volatility is not of concern, the storage container 190 may comprise an enclosed volume that is not hermetically sealed, and may, for example, comprise perforations. In some embodiments, the additive pod 100 need not be disposed in a storage container.

FIG. 2 shows show one embodiment of an apparatus for introducing an additive 220 into a fluid stream, the additive being disposed in an additive holding chamber 210 of an additive pod 200, wherein the additive pod further comprises at least one engagement tab 250 and respective upstream and downstream sealing members 230, 232. Details of the at least one engagement tab are discussed in more detail below, with reference to FIGS. 5 and 6. Upstream and downstream sealing members are discussed in more detail below, with reference to FIG. 4. In some embodiments, the apparatus comprises at least one additive retaining member 260 configured to retain the additive 220 within the additive holding chamber prior to dispersion of the additive into the fluid stream.

Figure 4:
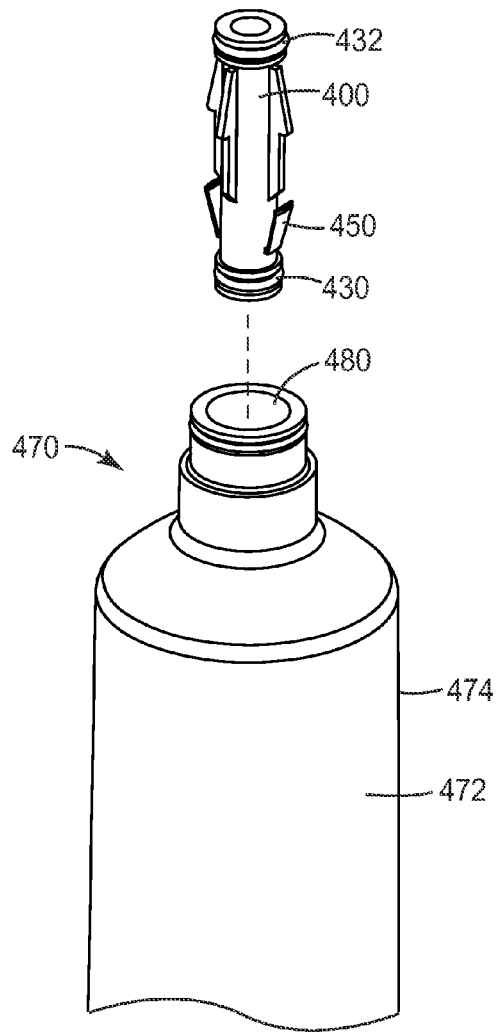

FIGS. 3 and 4 are respective exploded views of an apparatus for introducing an additive into a fluid stream as they may be disposed in an outlet portion of a fluid handling apparatus. In some embodiments, such as that shown in FIG. 3, the additive pod 300 may not comprise upstream or downstream sealing members. In such embodiments, the additive pod 300 may be configured to drop into an outlet portion 380 of a fluid handling apparatus 370 that already comprises any necessary sealing means. In some embodiments, the fluid handling apparatus comprises a filter cartridge 372, 472 having a housing 374, 474. In other embodiments, such as that shown in FIG. 4, the additive pod 400 may comprise engagement tabs 450 and respective upstream and downstream sealing members 430, 432. In such embodiments, the additive pod 400 may be configured to install into an outlet portion 480 of a fluid handling apparatus 470, whereupon engagement tabs 450 engage with at least one receiving member in the outlet portion 480, and whereupon the upstream sealing member 430 sealingly engages with an inner wall of the outlet portion 480. Downstream sealing member 432, when so employed, is configured to sealingly engage any corresponding downstream sealing surface as may be appropriate for the given application. Where the fluid handling apparatus 470 comprises a filter cartridge 472, for example, the downstream sealing member 432 may sealingly engage with a sealing surface on a compatible manifold assembly. It is envisioned that, where employed, respective upstream and downstream sealing members 430, 432 may comprise, for example, o-rings, gaskets, or overmolded seals. It is further envisioned that, where multiple sealing members are employed, such sealing members may comprise the same or different materials and may be the same size or differently sized, as appropriate to the application.

Figure 5:
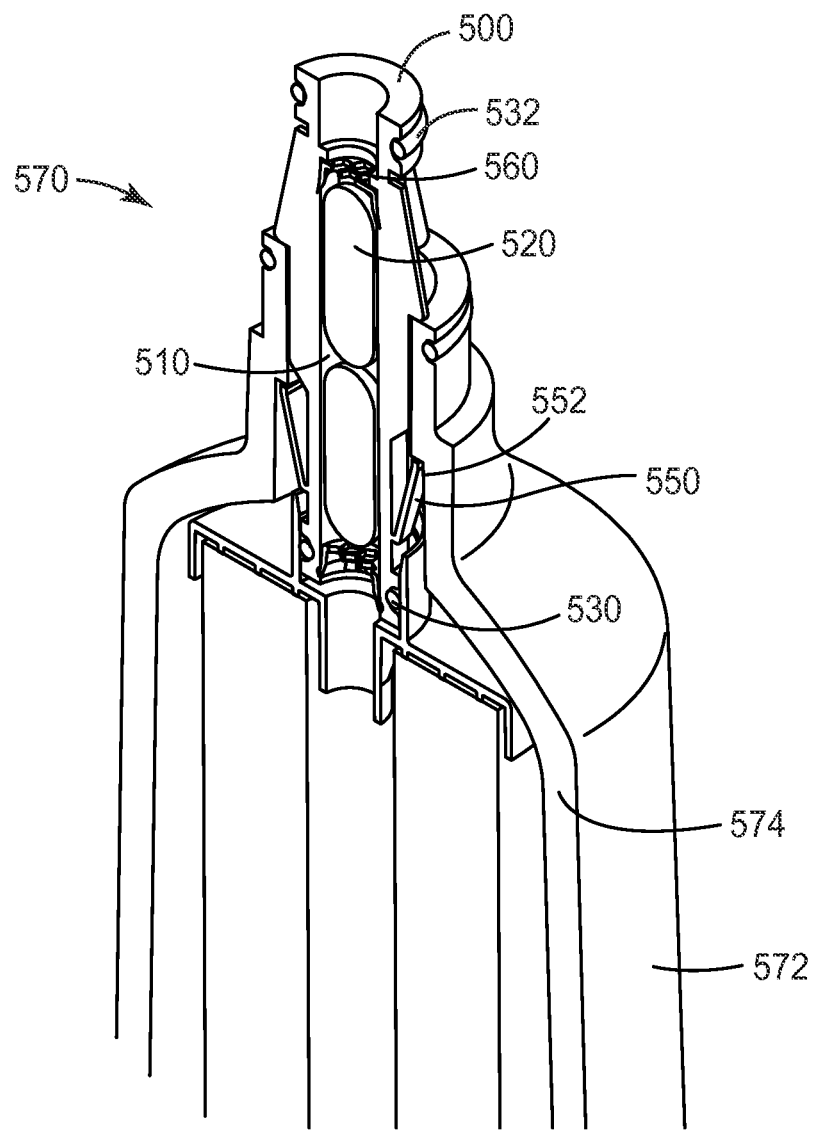
FIG. 5 is a cross-sectional view of an apparatus for introducing an additive into a fluid stream disposed in an outlet portion of a fluid handling apparatus.

FIG. 5 is a cross-sectional view of an apparatus for introducing an additive into a fluid stream disposed in an outlet portion of a fluid handling apparatus 570. In the embodiment shown, the fluid handling apparatus 570 comprises a filter cartridge 572 having a housing 574 and an internal filter element and the additive pod 500 comprises engagement tabs 550 that are engaged with receiving member 552 in the outlet portion of the filter cartridge. In this embodiment, receiving member 552 comprises a circumferential ridge that is engageable with a distal portion of each flared engagement tab 550. As further shown in this embodiment, upstream sealing member 530 may be sealingly engaged with a sealing surface in the filter cartridge. Additive 520 is disposed in the additive holding chamber 510 and may be retained by respective upstream and downstream additive retaining members 560. Downstream sealing member 532 may be configured to sealingy engage with a corresponding sealing surface on a compatible manifold assembly.

Where employed as shown in FIGS. 2, 4, and 5, the at least one engagement tab 250, 450, 550 may comprise a tab projecting from an outer radial surface of the additive pod. Such tab may be spring-loaded and flared at an angle to a longitudinal axis of the additive pod, and having a distal portion, such that the additive pod may be inserted into an outlet portion 580, 680 of a fluid handling apparatus 570, 670, whereupon the distal portion of at least one engagement tab 250, 550 cooperatively engages at least one corresponding receiving member 552, 652, as further shown in FIGS. 5 and 6. In such embodiments, the additive pod is not be readily removable from the fluid handling apparatus until an appropriate motion is imparted to the additive pod to effectively disengage each at least one engagement tab from each at least one receiving member. Such disengagement may be facilitated by cooperation of each engagement tab 550 with at least one release member 654, as shown in FIG. 6.

Figure 6:
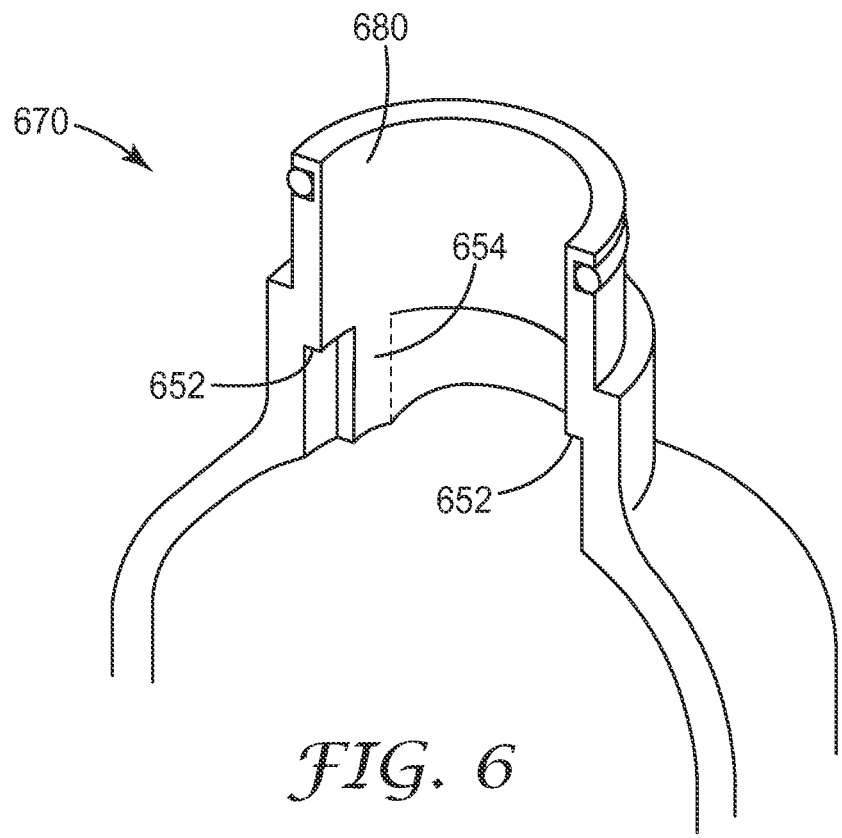
FIGS. 6 and 6A show an outlet portion of a fluid handling apparatus comprising at least one release member configured to cooperate with an additive pod to facilitate disengagement of the additive pod from the outlet portion.
Figure 6A:
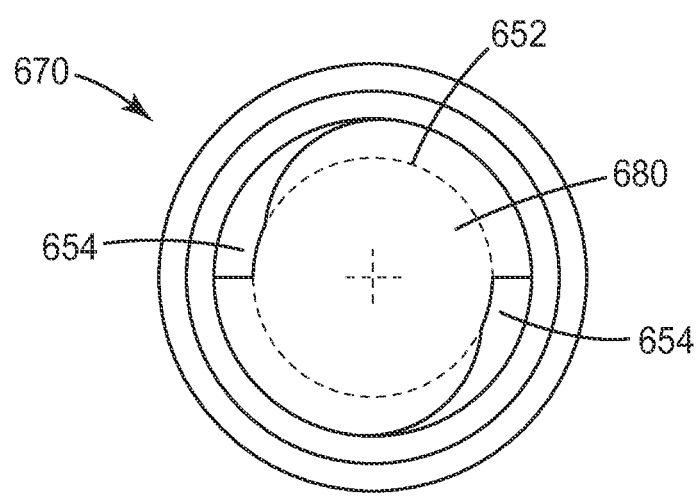

FIG. 6 shows an outlet portion 680 of a fluid handling apparatus 670 comprising at least one release member 654 configured to cooperate with an additive pod to facilitate disengagement of the additive pod from the outlet portion. In such embodiments, the at least one release member 654 comprises at least one radially-inward facing arcuate ramp that slidingly facilitates proportional depression of a spring-loaded portion of an engagement tab through rotation of the additive pod about its longitudinal axis. Upon sufficient depression of an engagement tab 550, a distal portion thereof will clear the receiving member 652, thereby allowing the additive pod to be pulled, in the direction of its longitudinal axis, from the outlet portion 680.

In some embodiments, such as those where the additive pod is not cylindrical in cross-section, the release member may be provided, for example, as a push-button release, whereupon pushing a release button acts to disengage the at least one engagement tab from the at least one receiving member, thereby allowing the additive pod to be removed from the fluid handling apparatus.

Regardless of the specific engagement system, it is desirable in many applications that the additive pod be easily installed into a fluid handling apparatus and removed therefrom by hand, without the use of tools. In some embodiments, the additive pod is not designed to be removed if, for example, the fluid handling apparatus (e.g., filter cartridge) is intended to be disposed of after the single use of an additive pod.

Figure 7:
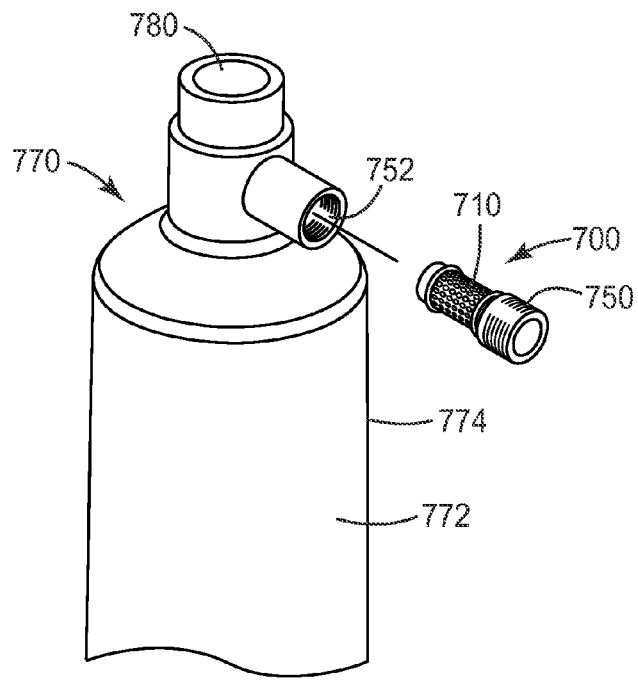
FIGS. 7 and 8 are respective exploded views of an apparatus for introducing an additive into a fluid stream as they may be disposed in an outlet portion of a fluid handling apparatus.
Figure 8:
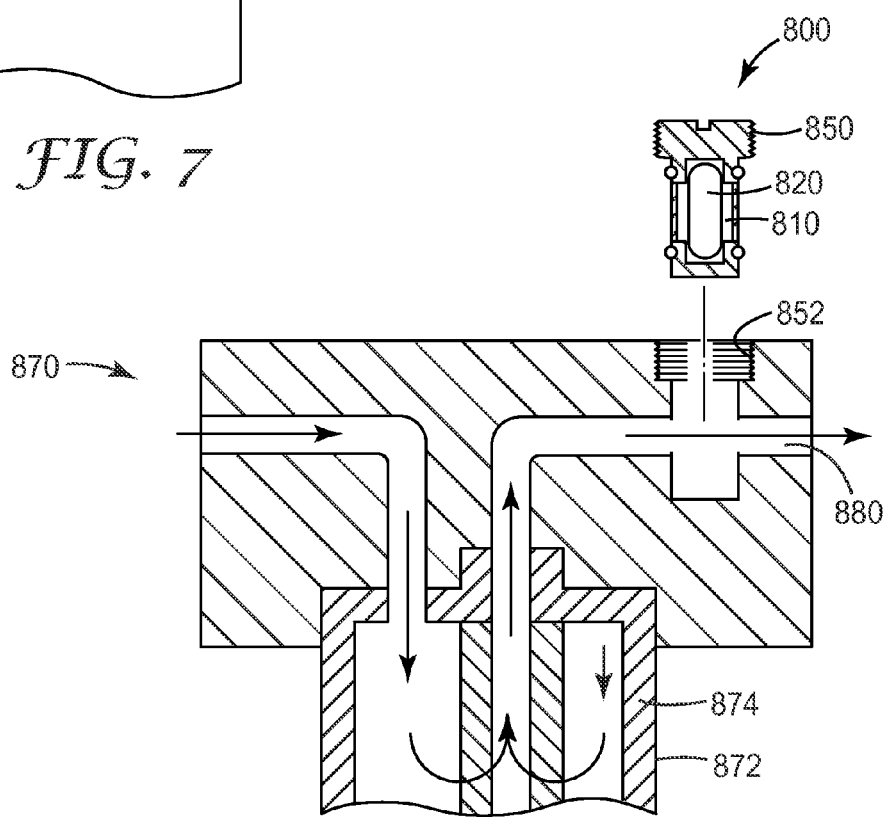

FIGS. 7 and 8 are respective exploded views of an apparatus for introducing an additive into a fluid stream as they may be disposed in an outlet portion 780, 880 of a fluid handling apparatus 770, 870. In some embodiments, an engagement tab 750, 850 and receiving member 752, 852 may comprise compatible male and female helical threads configured to allow simple screw-in/screw-out cooperation between the additive pod 700, 800 and the outlet portion 780, 880 of the fluid handling apparatus 770, 870.

In FIG. 7, an additive pod 700 is threadably insertable into an outlet portion 780 of a fluid handling apparatus 770, wherein threadable insertion is performed through a port having an axis that is substantially perpendicular to the longitudinal axis of the fluid handling apparatus 770. As shown in FIG. 7, the fluid handling apparatus may comprise a filter cartridge 772 having a housing 774.

In FIG. 8, an additive pod 800 is threadably insertable into an outlet portion 880 of a fluid handling apparatus 870, wherein threadable insertion is performed through a port having an axis that is substantially perpendicular to the longitudinal axis of an internal conduit of the fluid handling apparatus 870, which is there shown as a filter manifold assembly. In such embodiments, the additive pod 800 need not be directly engageable with, for example, a filter cartridge 872 having a housing 874.

In embodiments as shown in FIGS. 7 and 8, for example, to facilitate fluid flow across the additive 820 in a direction substantially perpendicular to the longitudinal axis of the additive pod 700, 800, the at least one sidewall of the additive holding chamber 710, 810 may be porous.

It is envision that, as opposed to the perpendicular insertion depicted in FIGS. 7 and 8 and described above, some embodiments may comprise similar threadable insertion wherein the additive pod is disposed coaxially with respect to the longitudinal axis of an internal conduit of a fluid handling apparatus. In some embodiments, whether threadably insertable or otherwise, fluid may flow into an additive pod along its longitudinal axis, and exit the additive pod perpendicular to its longitudinal axis. In other embodiments fluid may flow into an additive pod perpendicular to its longitudinal axis, and exit the additive pod along its longitudinal axis.

In such threadably insertable embodiments, sealing members may be provided about one or both ends of the additive holding chamber 710, 810 to sealingly engage with corresponding sealing surfaces in an outlet portion 780, 880 of a fluid handling apparatus 770, 870.

Figure 9:
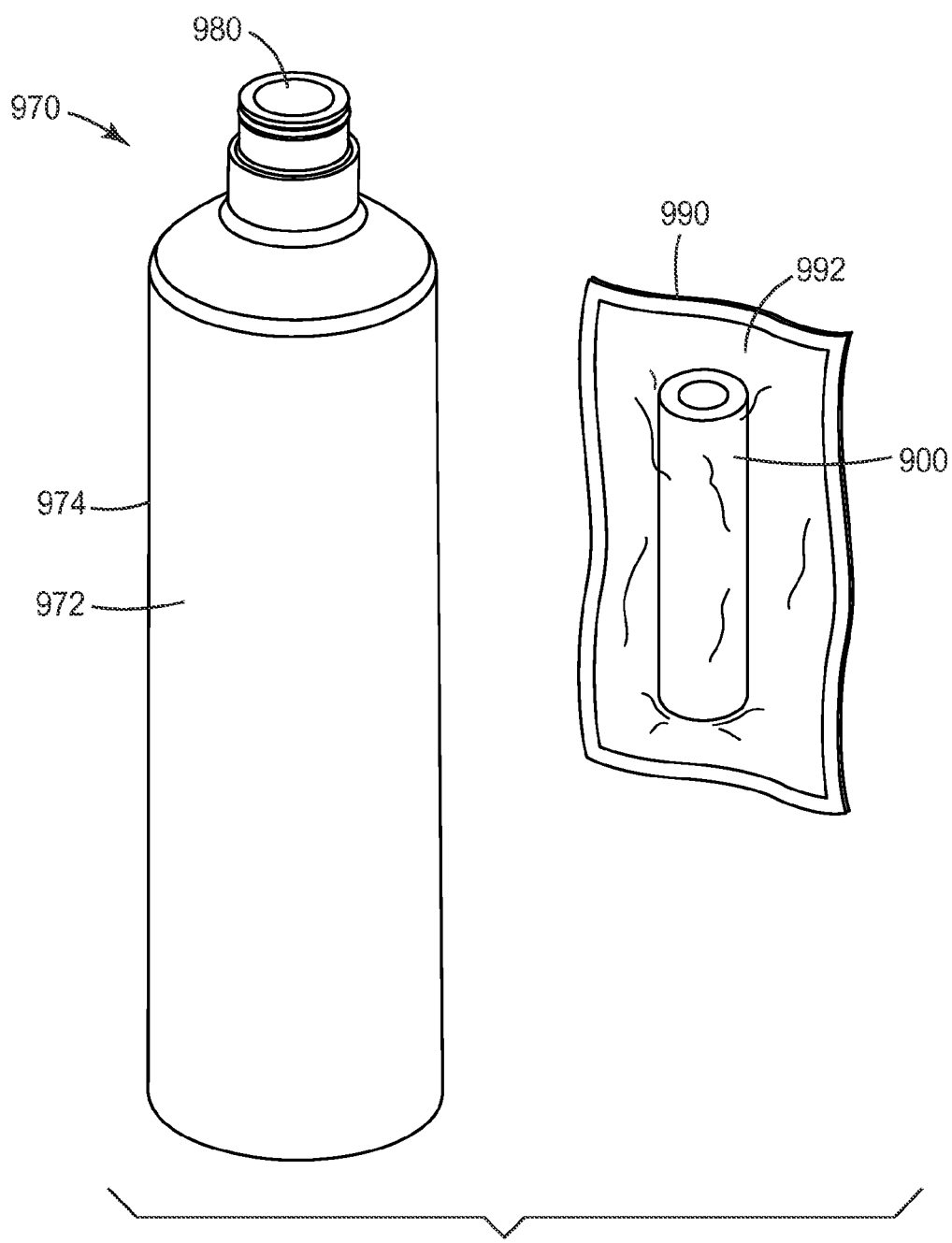
FIG. 9 shows one example of a system for introducing an additive into a fluid stream, the system comprising a fluid handling apparatus and an additive pod disposed within an enclosed volume of a storage container.

FIG. 9 shows one example of a system for introducing an additive into a fluid stream, the system comprising a fluid handling apparatus 970 and an additive pod 900 disposed within an enclosed volume 992 of a storage container 990, wherein the additive pod is configured to be installed into the outlet portion 980 of the fluid handling apparatus. In some embodiments, the fluid handling apparatus comprises a filter cartridge 972 having a housing 974. In some embodiments, the additive pod 900 is hermetically sealed within the enclosed volume 992.

While FIG. 9 depicts a fluid handling apparatus 970 that is separate from an additive pod 900, it is envisioned that the system may also be provided with the additive pod pre-installed into the outlet portion, and the entire assembly disposed within an enclosed volume of a storage container. Such storage container may or may not be hermetically sealed, depending on the composition of the additive and the desired application.

In operation, an additive pod may be disposed in a fluid stream of a fluid handling apparatus. The fluid handling apparatus may comprise a filter cartridge, in which case the additive pod is typically disposed downstream of a filter media. A fluid stream flowing through the outlet portion of a fluid handling apparatus will flow through the additive holding chamber defined by at least one sidewall, wherein at least one additive is disposed. In some embodiments, the at least one sidewall may be porous, thereby allowing the fluid stream to pass through the sidewall. In other embodiments, the additive holding chamber may comprise opposed open ends through which the fluid stream may flow. When the fluid stream flows through the additive holding chamber, it contacts the at least one additive disposed therein. Upon contact with the fluid stream, the additive will gradually dissolve or otherwise dissociate, thereby mixing with the passing fluid stream. The fluid stream, now mixed with the additive, exits the additive holding chamber and continues to flow into any associated downstream plumbing. Where the additive comprises a sanitizer, the fluid stream, along with internal walls of downstream plumbing, thereby undergo a sanitizing treatment. In some cases, the downstream plumbing will comprise a fluid dispensing portion, for example, a faucet, a drinking fountain spigot, or a pitcher pouring spout.

In is envisioned that, in some embodiments, an additive pod may form a functionally integral part of a fluid handling apparatus, rather than, for example, an independent downstream additive injection device. Where an additive pod is considered functionally integral to (though mechanically separable from) a fluid handling apparatus, the additive pod may further serve as, for example, a keying feature. Where the fluid handling apparatus is a filter cartridge, a compatible manifold assembly may comprise a complementary keying feature, thereby allowing only filter cartridges carrying properly keyed additive pods to be installed. Such a keying feature can enhance product functionality in a number of ways.

For example, it is envisioned that certain additives may be disposed in additive pods having associated unique keying geometry, thereby providing visual indication of the additive type and means for mechanical prevention of dispersing the wrong additive for a given application. In such embodiments, the end user has a quick and efficient means of identifying the type of additive that was previously installed, enabling reliable re-installation of a proper additive upon service.

Such a keying feature can further enhance product functionality by assuring that only properly designed additive pods are installed in a fluid handling apparatus. In some situations, for example, it may be desirable to ensure that only direct replacement additive pods are installed. One example of such a situation is where the integrity of a fluid seal may be compromised by an improperly sized or toleranced additive pod. Where such fluid seals are critical for proper operation, a keying feature may provide assurance of system integrity through visual and mechanical indication that a properly dimensioned additive pod has been selected and installed.

In addition to the above product functionality improvements, it is envisioned that keying features may provide benefits in manufacturing efficiency. For example, a manufacturer could produce a universal filter cartridge housing while providing sets of keyed additive pods and manifold assemblies for given applications or customers. In this way, a manufacturer could realize cost reduction through the manufacture of a common filter cartridge housing using a single set of tooling, while still providing product customization and differentiation through keyed additive pods and manifold assemblies.

Another example of a product functionality benefit realizable through the incorporation of a keying feature is the assurance that a fluid handling apparatus is properly installed and operational. For example, a fluid handling apparatus may be configured to be inoperable in the absence of a proper additive pod. In this way, for example, should an end user forget to replace or re-install an additive pod upon service, the absence of a proper additive pod can prevent fluid flow through the apparatus. For example, where the fluid handling apparatus is a filter cartridge, the additive pod with a keying feature may comprise structure configured to actuate a fluid valve upon installation of the filter cartridge into a compatible manifold assembly. Should the cartridge be mistakenly installed without the additive pod, for example, the valve will not actuate and fluid will not flow, thereby preventing system operation upon accidental omission of a proper additive pod.

Exemplary keying features may include, for example, one or a series of complementary protrusions and recesses disposed on either or both the additive pod and a compatible manifold assembly. Such protrusions may include, for example, specific shape profiles for easy visual indication or enhanced mechanical alignment capability.

In some embodiments, particularly where a keying feature is employed, an additive pod may be optionally provided with no additive. In such embodiments, the additive pod may be employed, not as a means for efficiently dispersing an additive into a fluid stream, but to take advantage of the above-described and other product functionality benefits realizable through the use of a keying feature.

It is envisioned that systems according to the present application are configured to be very easily installed and replaced by persons needing little or no specialized training or tools. For example, where the fluid handling apparatus is a filter cartridge, complete replacement of an additive pod in a working system may comprise the steps of (i) a single motion to disengage the filter cartridge from a compatible manifold, (ii) a single motion to remove a spent additive pod from the outlet portion of the filter cartridge, (iii) removing a new additive pod from a storage container, (iv) a single motion to install the new additive pod into the outlet portion of the filter cartridge, and (v) a single motion to re-install filter cartridge into the compatible manifold assembly.

It is to be understood that even in the numerous characteristics and advantages of the present invention set forth in above description and examples, together with details of the structure and function of the invention, the disclosure is illustrative only. Changes can be made to detail, especially in matters of shape, size and arrangement of the additive pod and methods of use within the principles of the invention to the full extent indicated by the meaning of the terms in which the appended claims are expressed and the equivalents of those structures and methods.

What is claimed is:

1. An apparatus for introducing additive into a fluid stream comprising
    an additive pod comprising at least one sidewall defining an additive holding chamber and at least one depressible engagement tab extending from the at least one sidewall that is flared at an angle to a longitudinal axis of the additive pod, the engagement tab having a distal portion configured to cooperatively engage with at least one receiving member on an outlet portion of a fluid handling apparatus;
    at least one additive disposed in the additive holding chamber, wherein the additive holding chamber is configured to disperse the additive into the fluid stream and wherein the additive holding chamber is configured to be disposed in an outlet portion of the fluid handling apparatus,
    wherein the additive pod has a first at least partially open axial end, a second at least partially open axial end, and the sidewall is a closed wall extending between the first at least partially open axial end and the second partially open axial end that allows fluid to flow into the additive pod along its longitudinal axis and allows fluid to exit the additive pod along its longitudinal axis.

2. The apparatus of claim 1 wherein the at least one sidewall is a substantially cylindrical tube.

3. The apparatus of claim 1 further comprising at least one additive retaining member configured to retain the additive within the additive holding chamber prior to dispersion of the additive into the fluid stream.

4. The apparatus of claim 1 further comprising a downstream trap member configured to prevent portions of non-dispersed additive from escaping the additive holding chamber.

5. The apparatus of claim 1 further comprising a storage container comprising at least one sidewall defining an enclosed volume, wherein the additive pod is disposed within the enclosed volume.

6. The apparatus of claim 5 wherein the additive pod is hermetically sealed within the enclosed volume.

7. The apparatus of claim 1 wherein the additive comprises a sanitizer.

8. The apparatus of claim 7 wherein the sanitizer is selected from the group consisting of chlorine, chlorine dioxide, iodine, hypoiodous acid, bromine, hypobromous acid, hypochlorous acid, fluorine, alcohol, hydrogen peroxide, ozone, and combinations thereof.

9. The apparatus of claim 1 wherein the additive comprises substances selected from the group consisting of flavoring agents, vitamins, dyes, scale inhibitors, and combinations thereof.

10. An apparatus for introducing an additive into a fluid stream comprising
    an additive pod comprising at least one sidewall defining an additive holding chamber and at least one depressible engagement tab extending from the at least one sidewall that is flared at an angle to a longitudinal axis of the additive pod, the engagement tab having a distal portion configured to cooperatively engage with at least one receiving member on an outlet portion of a fluid handling apparatus, wherein at least a portion of the at least one sidewall is porous;
    at least one additive disposed in the additive holding chamber, wherein the additive holding chamber is configured to disperse the additive into the fluid stream and wherein the additive holding chamber is configured to be disposed in an outlet portion of a fluid handling apparatus;
    wherein the additive pod further comprises:
    at least one upstream sealing member configured to form a seal with the outlet portion of the fluid handling apparatus;
    at least one downstream sealing member configured to form a seal with a downstream article.

11. The apparatus of claim 10 further comprising at least one additive retaining member configured to retain the additive within the additive holding chamber prior to dispersion of the additive into the fluid stream.

12. The apparatus of claim 10 further comprising a storage container comprising at least one sidewall defining an enclosed volume, wherein the additive pod is hermetically sealed within the enclosed volume.

13. The apparatus of claim 10 wherein the additive comprises a sanitizer selected from the group consisting of chlorine, chlorine dioxide, iodine, hypoiodous acid, bromine, hypobromous acid, hypochlorous acid, fluorine, alcohol, hydrogen peroxide, ozone, and combinations thereof.

14. A system for introducing an additive into a fluid stream comprising a filter cartridge having a housing and an outlet portion, wherein an outlet flow stream exits the housing through the outlet portion;

an additive pod comprising at least one sidewall defining an additive holding chamber and at least one depressible engagement tab extending from the at least one sidewall that is flared at an angle to a longitudinal axis of the additive pod, the engagement tab having a distal portion configured to cooperatively engage with at least one receiving member on an outlet portion of a fluid handing apparatus, wherein the additive pod has a first at least partially open axial end, a second at least partially open axial end, and the sidewall is a closed wall extending between the first at least partially open axial end and the second partially open axial end that allows fluid to flow into the additive pod along its longitudinal axis and allows fluid to exit the additive pod along its longitudinal axis;

at least one additive disposed in the additive holding chamber, wherein the additive holding chamber is configured to disperse the additive into the fluid stream;

wherein the additive holding chamber is configured to be disposed in the outlet portion of the filter cartridge.

15. The system of claim 14 wherein the outlet portion further comprises at least one release member configured to cooperate with the additive pod to facilitate disengagement of the additive pod from the outlet portion.

16. The system of claim 14 further comprising a storage container comprising at least one sidewall defining an enclosed volume, wherein the additive pod is disposed within the enclosed volume.

17. The system of claim 14 wherein the additive holding chamber is disposed in the outlet portion of the filter cartridge.

* * * * *

UNITED STATES PATENT AND TRADEMARK OFFICE
CERTIFICATE OF CORRECTION

| | | |
|---|---|---|
| PATENT NO. | : 8,940,163 B2 | Page 1 of 1 |
| APPLICATION NO. | : 13/054955 | |
| DATED | : January 27, 2015 | |
| INVENTOR(S) | : Laurence Bassett | |

It is certified that error appears in the above-identified patent and that said Letters Patent is hereby corrected as shown below:

In the Claims

Column 9
Line 48, in Claim 1, after "introducing" insert -- an --, therefor.
Line 62, in Claim 1, delete "the" and insert -- a --, therefor.

Column 11
Line 10, in Claim 14, delete "handing" and insert -- handling --, therefor.

Signed and Sealed this
Seventh Day of July, 2015

Michelle K. Lee
*Director of the United States Patent and Trademark Office*